United States Patent
Wu et al.

(10) Patent No.: US 9,152,586 B2
(45) Date of Patent: Oct. 6, 2015

(54) COHERENT CACHE SYSTEM WITH OPTIONAL ACKNOWLEDGEMENT FOR OUT-OF-ORDER COHERENCE TRANSACTION COMPLETION

(71) Applicant: Texas Instruments Incorporated, Dallas, TX (US)

(72) Inventors: Daniel B Wu, Dallas, TX (US); Matthew D Pierson, Murphy, TX (US); Kai Chirca, Dallas, TX (US); Timothy D Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 86 days.

(21) Appl. No.: 14/056,775

(22) Filed: Oct. 17, 2013

(65) Prior Publication Data

US 2014/0115266 A1    Apr. 24, 2014

Related U.S. Application Data

(60) Provisional application No. 61/717,823, filed on Oct. 24, 2012.

(51) Int. Cl.
*G06F 13/16* (2006.01)
*G06F 13/40* (2006.01)
*G06F 12/08* (2006.01)

(52) U.S. Cl.
CPC ........ *G06F 13/1689* (2013.01); *G06F 12/0815* (2013.01); *G06F 12/0831* (2013.01); *G06F 13/4027* (2013.01)

(58) Field of Classification Search
CPC .......................... G06F 13/1689; G06F 13/4027
USPC .................... 711/141, 146, 152; 710/1, 5, 300
See application file for complete search history.

(56) References Cited

U.S. PATENT DOCUMENTS

| | | | | |
|---|---|---|---|---|
| 7,089,376 B2 * | 8/2006 | Dieffenderfer et al. | ........ | 711/146 |
| 7,366,847 B2 * | 4/2008 | Kruckemyer et al. | ........ | 711/144 |
| 8,725,958 B2 * | 5/2014 | Takata | .......... | 711/152 |
| 8,918,591 B2 * | 12/2014 | Moyer | .......... | 711/146 |
| 2011/0161599 A1 * | 6/2011 | Craske | .......... | 711/141 |
| 2013/0117511 A1 * | 5/2013 | Brown et al. | ........ | 711/141 |

* cited by examiner

*Primary Examiner* — Tammara Peyton
(74) *Attorney, Agent, or Firm* — Robert D. Marshall, Jr.; Frank D. Cimino

(57) ABSTRACT

To enable efficient tracking of transactions, an acknowledgement expected signal is used to give the cache coherent interconnect a hint for whether a transaction requires coherent ownership tracking. This signal informs the cache coherent interconnect to expect an ownership transfer acknowledgement signal from the initiating master upon read/write transfer completion. The cache coherent interconnect can therefore continue tracking the transaction at its point of coherency until it receives the acknowledgement from the initiating master only when necessary.

4 Claims, 1 Drawing Sheet

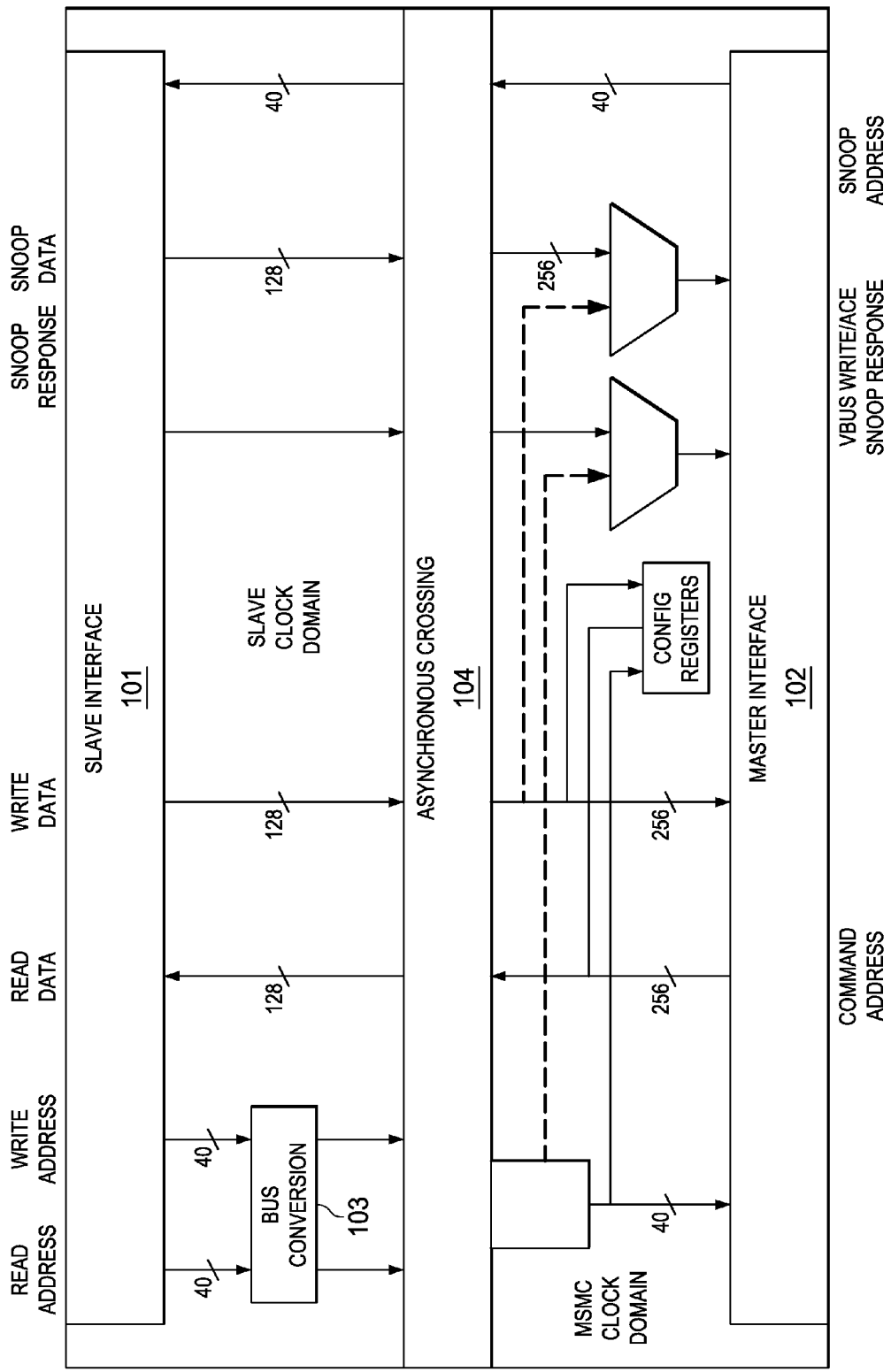

COHERENT CACHE SYSTEM WITH OPTIONAL ACKNOWLEDGEMENT FOR OUT-OF-ORDER COHERENCE TRANSACTION COMPLETION

CLAIM OF PRIORITY

This application claims priority under 35 U.S.C. 119(e)(1) to Provisional Application No. 61/717,823 filed 24 Oct. 2012.

TECHNICAL FIELD OF THE INVENTION

The technical field of this invention is interprocessor communications.

BACKGROUND OF THE INVENTION

In today's large SOCs that contain multiple compute cores, the cores can be running on different power domains (thus on separate PLLs) in order to gain full clock speed entitlement. However, there may be times when some of this compute power isn't necessary and could to be powered down in order to reduce the overall power consumption of the device.

If the unit being powered down is a cache coherent master in a cache coherent interconnect system, the transition of the master into a fully powered down non-responsive state needs to be well understood by the rest of the system and the interconnect. With regards to snoop transactions, the power down transition needs to ensure that hang situations are avoided:
1) snoop transactions may be dropped because the interconnect has already sent snoop transactions to the master before the interconnect has knowledge that the master is powering down,
2) snoop responses may be dropped by the master if the power down mechanism doesn't anticipate that snoop transactions are still in the process of being serviced and simply powers down.

Memory Endian has typical been viewed as a Chip-Wide state. The entire chip has a single memory view that is aligned across all components in the system. As more individual processor cores have been added over time to make System on Chips (SOCs), where processors are individually attached to an interconnect and can each be running different code, the need for multi-endian views of the system memory has become necessary.

In a large scale System-on-Chip, the integration of multiple processors in a high performance device poses many additional challenges:

How to effectively integrate processors that support different protocols?

How to gain full processor performance and speed entitlement?

How to gain full code execution entitlement when there are multiple cores within a processor?

How to maintain memory coherency and synchronization between processors?

How to handle coherency when a processor is powered-down?

SUMMARY OF THE INVENTION

In a coherent cache system, a typical coherent cache master can both initiate (as a master) and receive (as a slave) cache transaction requests to/from the interconnect. A cache coherent master can send an acknowledgement signal to signal the completion of a cache line ownership transfer.

To enable efficient tracking of transactions, an acknowledgement_expected signal (hereafter referred to as ack_expected) is used to give the interconnect a hint for whether a transaction requires coherent ownership tracking.

The initiating master provides a unique ID for each request it sends to the interconnect. For the return response, the interconnect provides this same unique ID with the return information to the initiating master. The master then uses this unique return ID to provide an accompanying acknowledgement ID signal (hereafter referred to as ack_id) with the master's ownership transfer acknowledgement signal.

BRIEF DESCRIPTION OF THE DRAWINGS

These and other aspects of this invention are illustrated in the drawings, in which:

FIG. 1 shows a block diagram of the dual-domain bridge.

DETAILED DESCRIPTION OF PREFERRED EMBODIMENTS

FIG. 1 shows an implementation of the asynchronous bridge operable to bridge different domains. Slave interface 101, operating in the slave domain is bridged to the master interface 102 operating in the Multicore Shared Memory Controller (MSMC) domain through asynchronous bridge 104. Since differences in data path width and memory endian may exist between the master and slave interfaces, bus width and endian conversion is performed in bus conversion 103 as needed. Data and requests are transferred asynchronously between both halves using FIFOs appropriately sized to prevent any throughput issues.

The powerdown procedure implemented in the bridge is the following:
1) The cache coherent master subsystem produces a powerdown request signal, which propagates to the interconnect power domain portion of the bridge,
2) The bridge detects this and temporarily stops accepting snoop transactions from the coherent interconnect,
3) The bridge then waits for all already in-flight snoop commands to be drained by auto responding to them since the coherent master will have already drained out its caches by this point. The bridge does this by internally score boarding all snoop transactions as they are accepted from the interconnect. If the master does happen to send any snoop responses at this point, they are accepted and dropped by the bridge as the master cache is clean/empty at this point (i.e the expected master snoop response is already known),
4) Once all in-flight snoop commands have been responded to the interconnect, the bridge sends the powerdown acknowledgement signal back across to the cache coherent master subsystem and simultaneously gates off all asynchronous transfer logic to prevent spurious signaling during the actual power gating/isolation transition,
5) Once the powerdown acknowledgement signal is sent, the bridge begins its auto snoop response mode where it generates "normal—no data" snoop responses for snoop commands from the interconnect.
6) For powerup, once the interconnect domain of the bridge detects a reset de-assertion transition from the cache coherent master subsystem domain, the bridge stops this auto snoop response mode and returns to its normal mode of passing snoop commands onto the attached cache coherent master and passing back the master's snoop response onto the coherent system interconnect.

7) Similarly, when the entire device/system-interconnect powers up and comes out of reset, but the master is held in reset and possibly powered down without going into a functional non-reset mode, the bridge detect this and enters its auto snoop response mode immediate upon the interconnect domain coming out of reset.

This solution provides a very simplistic approach to the powerdown of a cache coherent master in a coherent interconnect system that eliminates the need to make the interconnect aware of the powerdown mode the cache coherent master is about to enter. Having to make the interconnect aware of the master powering down, requires either that the interconnect has to resolve in-flight snoop transactions already sent before the interconnect has observed the powerdown hint from the master or that the master has to be able to service all snoop responses even during the powerdown sequence.

The described solution allows the interconnect to be simplified by never having to comprehend the powerdown nature of the cache coherent master and having the guarantee that snoop transactions will always be responded to. The master can also be simplified knowing that it can safely powerdown irrespective of whether there are still snoop transactions being serviced by its logic.

Lastly, on powerup, the interconnect and master do not need to share any powerup information between them, the bridge seamlessly transitioning back to the snoop transaction pass through mode when it detects that the master has powered-up and came out of reset.

Memory Endian has typical been viewed as a Chip-Wide state. The entire chip has a single memory view that is aligned across all components in the system. As more individual processor cores have been added over time to make System on Chips (SOCs), where processors are individually attached to an interconnect and can each be running different code, the need for multi-endian views of the system memory has become necessary. In the next evolution, multiple processors are now bundled into a subsystem which acts as a single master connected to the interconnect. The subsystem typically has a shared memory controller entity which unifies the memory traffic into a single interface that attaches to the system interconnect. While an interconnect can be expected to support multiple masters with different endian memory views of the system, this doesn't inherently support the use-model where multiple processors with different memory endian views are attached to the interconnect through the same shared master interface. Each processor in the subsystem can potentially be running their own application and thus are not required to all have the same memory endian view.

The solution to the problem as described in this invention is to add a bridge between the subsystem and the interconnect which is aware of the number of processors within the subsystem. The bridge is aware of the current endian view used by each individual processor within the attached subsystem and can perform the appropriate endian conversion on each processor's individual transactions to adapt the transaction to/from the endian view used by the interconnect/system.

The implementation uses endian-invariant memory mapped registers (MMRs) to allow each processor within the subsystem (regardless of their current endian view) to program the bridge to be aware of the processor's current endian view. Another potential implementation would be to provide a signal from the processor which could convey the processor's current endian view.

This solutions allows processors within the subsystem to have different endian views of the system memory and thus allowing each processor's thread/OS/application to have the full entitlement since its endian view can be independent of the view of the other processors within the subsystem. Full entitlement can be among other things—not having to modify code for endian related conversions thus gaining full processor execution entitlement, or taking advantage of platform specific behavior with may benefit certain endian views, or providing the flexibility to allow the code developer to choose which ever endian mode they are most familiar with. This solution allows all processors within a subsystem to have full entitlement since they can individually choose their endian view independent of the endian view used by the other processors within the same subsystem.

The asynchronous bridge maintains an endian-independent view of MMR space by swapping the bytes within a word when the slave CPU is big endian to return to the little endian view of an MMR word and also word swapping when MSMC is big endian to move the MMR word into the correct byte lanes as shown in Table 1.

TABLE 1

| | | Eagle (seen on EN slave AXI port) | | | | MSMC (seen on EN Master VBusM port) | |
|---|---|---|---|---|---|---|---|
| | | | 15 | 0 | | 31 | 0 |
| Non-MMR space | | | | | | | |
| Eagle CPU view | | | | | ⇕ EN ⇕ | | |
| Instruction-no change | LE | 15 14 13 12 11 10 9 8 7 6 5 4 3 2 1 0 / 31 30 29 28 27 26 25 24 23 22 21 20 19 18 17 16 | DP1 DP2 | | LE | 31 30 29 28 - 27 26 25 24 - 23 22 21 20 - 19 18 17 16 - 15 14 13 12 - 11 10 9 8 - 7 6 5 4 - 3 2 1 0 | |
| CPU data 32b reg [3210] | LE | 15 14 13 12 11 10 9 8 7 6 5 4 3 2 1 0 / 31 30 29 28 27 26 25 24 23 22 21 20 19 18 17 16 | | | BE | 0 1 2 3 - 4 5 6 7 - 8 9 10 11 - 12 13 14 15 - 16 17 18 19 - 20 21 22 23 - 24 25 26 27 - 28 29 30 31 | |
| Instruction-no change | BE | 15 14 13 12 11 10 9 8 7 6 5 4 3 2 1 0 / 31 30 29 28 27 26 25 24 23 22 21 20 19 18 17 16 | | | LE | 31 30 29 28 - 27 26 25 24 - 23 22 21 20 - 19 18 17 16 - 15 14 13 12 - 11 10 9 8 - 7 6 5 4 - 3 2 1 0 | |
| CPU data 32b reg [0123] | BE | 15 14 13 12 11 10 9 8 7 6 5 4 3 2 1 0 / 31 30 29 28 27 26 25 24 23 22 21 20 19 18 17 16 | | | BE | 0 1 2 3 - 4 5 6 7 - 8 9 10 11 - 12 13 14 15 - 16 17 18 19 - 20 21 22 23 - 24 25 26 27 - 28 29 30 31 | |
| MMR space | | | | | | | |
| Eagle CPU view | | | | | ⇕ EN ⇕ | | |
| Instruction-no change | LE | 15 14 13 12 11 10 9 8 7 6 5 4 3 2 1 0 / 31 30 29 28 27 26 25 24 23 22 21 20 19 18 17 16 | | | LE | 31 30 29 28 - 27 26 25 24 - 23 22 21 20 - 19 18 17 16 - 15 14 13 12 - 11 10 9 8 - 7 6 5 4 - 3 2 1 0 | |
| CPU data 32b reg [3210] | LE | 15 14 13 12 11 10 9 8 7 6 5 4 3 2 1 0 / 31 30 29 28 27 26 25 24 23 22 21 20 19 18 17 16 | | | BE | 3 2 1 0 - 7 6 5 4 - 11 10 9 8 - 15 14 13 12 - 19 18 17 16 - 23 22 21 20 - 27 26 25 24 - 31 30 29 28 | |
| Instruction-no change | BE | 12 13 14 15 8 9 10 11 4 5 6 7 0 1 2 3 / 28 29 30 31 24 25 26 27 20 21 22 23 16 17 18 19 | | | LE | 31 30 29 28 - 27 26 25 24 - 23 22 21 20 - 19 18 17 16 - 15 14 13 12 - 11 10 9 8 - 7 6 5 4 - 3 2 1 0 | |
| CPU data 32b reg [3210] | BE | 12 13 14 15 8 9 10 11 4 5 6 7 0 1 2 3 / 28 29 30 31 24 25 26 27 20 21 22 23 16 17 18 19 | | | BE | 3 2 1 0 - 7 6 5 4 - 11 10 9 8 - 15 14 13 12 - 19 18 17 16 - 23 22 21 20 - 27 26 25 24 - 31 30 29 28 | |

The asynchronous bridge also converts transactions from the processor's bus protocol into the bus protocol used by the interconnect and vice versa for return responses. The bridge provides support for a multi-core processor by allowing core-specific management of endian mode, privilege ID, and master ID.

For synchronization, the bridge handles barrier transactions and provides a loop-back mode for virtual message transactions, thereby not exposing them to the interconnect if they are not supported or required. A barrier transaction is a transaction that has a property that transactions that it controls must not be reordered with respect to it. Thus, it can be inserted into a stream of transaction requests to maintain the order of the transactions it controls and thereby prevent some transactions being performed before others.

For coherency, the bridge supports separating read/write transactions from the processor into blocking and non-block channels for a cache coherent interconnect. For snoop traffic, the bridge provides pass through channels for snoop transactions/responses/data. The bridge also supports efficient cache ownership transfers by giving ownership transfer request hints to the interconnect and out-of-order ownership transfer completion signaling information.

In a coherent cache system, a typical coherent cache master can both initiate (as a master) and receive (as a slave) cache transaction requests to/from the interconnect. A cache coherent master can send an acknowledgement signal to signal the completion of an ownership transfer. The exact transfer sequences are:

1. Read Command (master)→Read Data/Response (slave)→Read ACK (master)
2. Write Command (master)→Write Response (slave)→Write ACK (master)

The acknowledgement signal is essential for supporting proper coherency in the system by ensuring a clear, explicit ownership transfer scheme that prevent time windows where the exact data ownership can be ambiguous between a cache coherent master and a coherent interconnect.

To enable efficient tracking of transactions, an acknowledgement expected signal (hereafter referred to as ack_expected) is used to give the interconnect a hint for whether a transaction requires coherent ownership tracking. The ack_expected informs the cache coherent interconnect to expect an ownership transfer acknowledgement signal from the initiating master upon read/write transfer completion. The cache coherent interconnect can therefore continue tracking the transaction at its point of coherency until it receives the acknowledgement from the initiating master only when necessary.

The initiating master provides a unique ID for each request it sends to the interconnect. For the return response, the interconnect provides this same unique ID with the return information to the initiating master. The master then uses this unique return ID to provide an accompanying acknowledgement ID signal (hereafter referred to as ack_id) with the master's ownership transfer acknowledgement signal. The additional ack_id therefore places the onus of return ordering requirements on the initiating master. The initiating master can retire the return responses as it sees fit and provides the corresponding acknowledgement and ack_id signal when necessary.

In a typical large scale SOC, a master can see varied return latencies from different memory endpoints which can depend on factors such as memory type and position in the system hierarchy. Implementations with a singular acknowledgement signal, without any additional unique identification information, rely on in-order returns from the interconnect and further place burden on an interconnect to maintain master specific protocol ordering requirements. The master's expected return ordering and the out of order return nature of a multi endpoint SOC are therefore coupled.

This invention allows the interconnect's inherently out-of-order return nature in a multi endpoint SOC to be de-coupled from a connected initiating master's specific ordering requirements by allowing the interconnect to freely return transaction responses to the initiating master as they become available and subsequently retire coherent transactions via an acknowledgement and ack_id.

The interconnect can also be greatly simplified to freely return transaction responses to the initiating master as they become available in an out of order fashion independent of the any in-order retirement policy implemented by an initiating master. Unrelated return responses that have no ordering requirements can also be processed sooner by the master thus improving performance. The interconnect can still efficiently track and retire ownership transfers via the ack_id without the added complexity of handling the actual response retirement ordering required by the master.

The bridge has buffering resources to support the full issuing capacity of the multi-core processor and thus allow efficient out-of-order responses from the interconnect. The bridge reorders the responses to match the processor's specific ordering requirements while making optimizations to improve cache transaction performance.

The following are some of the advantages realized by the asynchronous bridge of this invention:

1) Bridging across 2 power/clock domains allows for full speed entitlement for both the processor and the interconnect. This also provides the flexibility to run each processor at a lower or higher power/performance level when necessary.
2) Having core-specific identification, endian behavior gives greater flexibility and independency to each core's software.
3) The synchronization support isolates barriers (and virtual messages when necessary) from the interconnect, thereby simplifying the interconnect design. If the interconnect natively lacks this support, our solution enables system barriers support (and mimics support for virtual messages) for the attached master. This allows software that takes advantage of these features to easily migrate to a system where the interconnect does provide native support.
4) The coherency support also simplifies the interconnect design by having the bridge handle the processor transaction repartitioning between block and non-block channels. The ownership transfer request hints and the transaction ownership retire information allow the interconnect to more efficiently allocate its transaction tracking resources.
5) The return buffering capacity allows the bridge to never stall any of the return interfaces from the interconnect since the bridge has sufficient capacity to match the processor's issuing capacity. This allows the interconnect to be simplified and return responses out-of-order and as soon as possible. The bridge is aware of the allowable re-ordering of responses to the master and takes advantage of this to re-order responses in an efficient manner that minimizes false inter-transactional dependencies that would introduce unnecessary additional latency on return responses.
6) The bridge's powerdown support isolates the processor powerdown and powerup from the interconnect. The bridge manages the transitions in a seamless fashion that simplifies otherwise complex issues of properly handling snoop transactions during a powerdown sequence without dropping snoop transactions/responses that could potentially hanging either the processor being powering down and/or the coherent system interconnect.

What is claimed is:

1. A coherent cache system, comprising of:

a coherent cache master operable to initiate transaction requests, each transaction request accompanied by a unique ID, and each initiated transaction request that requires coherent ownership tracking being further accompanied by an acknowledgement expected signal, transmit an acknowledge ID signal corresponding to a unique ID upon said coherent cache master taking ownership of a response to a transaction request, a cache slave operable to respond to transaction requests, and a cache coherent interconnect connected to said coherent cache master and said cache slave, said cache coherent interconnect operable to transmit a transaction request initiated by said coherent cache master to said cache slave, transmit a response to a transaction request received from said cache slave to said coherent cache master and cease tracking a response to a transaction request if said corresponding transaction request was not accompanied by an acknowledgement expected signal, continue tracking a response to a transaction request if said corresponding transaction request was accompanied by an acknowledgement expected signal, and cease tracking a transaction request/response if said corresponding transaction request was accompanied by an acknowledgement expected signal upon receipt of an acknowledge ID signal corresponding to a unique ID from said coherent cache master.

2. The coherent cache system of claim 1 wherein:

said cache coherent master includes a plurality of coherent cache masters.

3. The coherent cache system of claim 1 wherein:

said cache slave includes a plurality of cache slaves.

4. The coherent cache system of claim 1 wherein:

said cache coherent interconnect is operable to transmit said corresponding unique ID to said coherent cache master upon transmission of said response to said transaction request received from said cache slave.

* * * * *